United States Patent
Hosie et al.

(10) Patent No.: US 9,940,163 B2
(45) Date of Patent: Apr. 10, 2018

(54) ORDERING REPEATING ELEMENTS WITHIN A MESSAGE

(71) Applicant: INTERNATIONAL BUSINESS MACHINES CORORATION, Armonk, NY (US)

(72) Inventors: John Hosie, Hursley (GB); Martin A. Ross, Hursley (GB); Craig H. Stirling, Hursley (GB); Dominic J. Storey, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/847,603

(22) Filed: Sep. 8, 2015

(65) Prior Publication Data
US 2017/0068566 A1    Mar. 9, 2017

(51) Int. Cl.
G06F 9/44   (2006.01)
G06F 9/46   (2006.01)
G06F 9/48   (2006.01)

(52) U.S. Cl.
CPC ................... G06F 9/4881 (2013.01)

(58) Field of Classification Search
CPC ......... G06F 9/466; G06F 9/546; G06F 9/4881
USPC ........................................................ 719/314
See application file for complete search history.

(56) References Cited

U.S. PATENT DOCUMENTS

| | | | |
|---|---|---|---|
| 7,155,483 B1 | 12/2006 | Friend et al. | |
| 7,463,939 B1* | 12/2008 | Mata | G06Q 10/10 700/100 |
| 8,805,938 B2 | 8/2014 | Yu | |
| 2002/0161814 A1* | 10/2002 | Wical | G06F 11/2025 718/101 |
| 2005/0165802 A1* | 7/2005 | Sethi | G06F 17/3056 |
| 2007/0171919 A1* | 7/2007 | Godman | H04L 67/40 370/396 |
| 2008/0126385 A1 | 5/2008 | Gaurav et al. | |
| 2009/0193095 A1 | 7/2009 | Coleman | |
| 2012/0159498 A1* | 6/2012 | Wilmarth | G06F 9/526 718/103 |

(Continued)

FOREIGN PATENT DOCUMENTS

CN    104360843 A    2/2015

OTHER PUBLICATIONS

Jackson, Callum, "Aggregation Functionality in IBM Web Sphere Enterprise Service Bus V6.1, Part 3: Best practices and patterns for aggregation," downloaded from internet Apr. 14, 2015, http://www.ibm.com/cleveloperworks/library/ws-websphereeb3/, pp. 1-17.

Primary Examiner — Hyung S. Sough
Assistant Examiner — Kimberly L Jordan
(74) Attorney, Agent, or Firm — Heslin Rothenberg Farley & Mesiti P.C.

(57) ABSTRACT

A queue of transactions is managed. A sort order for the queue of transaction is determined. A first batch of transactions is sorted according to the determined sort order and a further batch of transactions is also sorted according to the determined sort order. A notifying is performed that the first batch of transactions is ready for processing and that the further batch of transactions is ready for processing. The sorting and notifying for further batches of the transactions continues until all the transactions in the queue have been sorted and notified as ready for processing.

15 Claims, 8 Drawing Sheets

(56) References Cited

U.S. PATENT DOCUMENTS

2013/0317975 A1* 11/2013 Gage ................. G06Q 30/0601
                                                    705/39
2014/0244832 A1*  8/2014 Beck ...................... G06F 9/546
                                                    709/224

* cited by examiner

```
EndOfDayTransactions>
    <Transaction id=0000001>
        <Amount>$123.45</Amount>
        <CardNumber>1111222233334444</CardNumber>
        <Item>Product A</Item>
        <Item>Product B</Item>
        <Item>Product C</Item>
        <Item>Product D</Item>
    </Transaction>
    <Transaction id=0000002>
        <Amount>$23.45</Amount>
        <CardNumber>2222333344445555</CardNumber>
        <Item>Product E</Item>
        <Item>Product F</Item>
    </Transaction>
    <Transaction id=0000003>
        <Amount>$12.34</Amount>
        <CardNumber>3333444455556666</CardNumber>
        <Item>Product G</Item>
        <Item>Product H</Item>
        <Item>Product I</Item>
        <Item>Product J</Item>
        <Item>Product K</Item>
    </Transaction>
    ...
    <Transaction id=9999999>
        <Amount>$1234.56</Amount>
        <CardNumber>6666777788889999</CardNumber>
        <Item>Product X</Item>
        <Item>Product Y</Item>
        <Item>Product Z</Item>
    </Transaction>
</EndOfDayTransactions>
```

FIGURE 4

| Element | Transaction | |
|---|---|---|
| 1 | Transaction id=0000001 | Batch |
| 2 | Transaction id=0000002 | Not Sorted |
| 3 | Transaction id=0000003 | |
| 4 | Transaction id=0000004 | |
| 5 | Transaction id=0000005 | |
| ... | | |
| 9999999 | Transaction id=9999999 | |

FIGURE 5A

| Element | Transaction | | |
|---|---|---|---|
| 1 | Transaction id=0000002 | 1st Batch | |
| 2 | Transaction id=0000001 | Sorted | ---- 1st Sync Point |
| 3 | Transaction id=0000003 | Remainder | |
| 4 | Transaction id=0000004 | of Batch | |
| 5 | Transaction id=0000005 | Not Sorted | |
| ... | | | |
| 9999999 | Transaction id=9999999 | | |

FIGURE 5B

| Element | Transaction | | |
|---|---|---|---|
| 1 | Transaction id=0000004 | 2nd Batch | |
| 2 | Transaction id=0000003 | Sorted | -- 1st Sync Point |
| 3 | Transaction id=0000002 | | |
| 4 | Transaction id=0000001 | | 2nd Sync Point |
| 5 | Transaction id=0000005 | Remainder | |
| ... | | of Batch | |
| 9999999 | Transaction id=9999999 | Not Sorted | |

FIGURE 5C

| Element | Transaction |  |
|---|---|---|
| 1 | Transaction id=0000001 | Batch |
| 2 | Transaction id=0000002 | Not Sorted |
| 3 | Transaction id=0000003 | |
| 4 | Transaction id=0000004 | |
| 5 | Transaction id=0000005 | |
| ... | | |
| 9999999 | Transaction id=9999999 | |

FIGURE 6A

| Element | Transaction |  |  |
|---|---|---|---|
| 1 | Transaction id=0000002 | 1st Batch | |
| 2 | Transaction id=0000001 | Sorted | — 1st Sync Point |
| 3 | Transaction id=0000003 | Remainder | |
| 4 | Transaction id=0000004 | of Batch | |
| 5 | Transaction id=0000005 | Not Sorted | |
| ... | | | |
| 9999999 | Transaction id=9999999 | | |

FIGURE 6B

| Element | Transaction |  |  |
|---|---|---|---|
| 1 | Transaction id=0000002 | 1st Batch | |
| 2 | Transaction id=0000001 | Sorted | — 1st Sync Point |
| 3 | Transaction id=0000006 | 2nd Batch | |
| 4 | Transaction id=0000005 | Sorted | |
| 5 | Transaction id=0000004 | | |
| 6 | Transaction id=0000003 | | — 2nd Sync Point |
| ... | | Remainder | |
| 9999999 | Transaction id=9999999 | of Batch | |
| | | Not Sorted | |

FIGURE 6C

ORDERING REPEATING ELEMENTS WITHIN A MESSAGE

BACKGROUND

One or more aspects of the present invention relate to ordering repeating elements within a message.

An enterprise service bus (ESB) system typically comprises one or more repeat nodes for processing a message of repeating elements. For a message with repeating elements, for example a batch of transactions collected over a business day, a repeating node will process each element in the order that it appears within the message. However, there may be high priority elements within the batch that would better be processed before low priority elements. For example, end of day transaction processing may take many hours so it would be better to process any transactions having a high fraud probability sooner rather than later.

SUMMARY

In accordance with one aspect of the invention, a computer system for managing a queue of transactions for processing is provided. The computer system includes a memory; and a processing device in communication with the memory, wherein the computer system is configured to perform a method. The method includes determining a sort order for the queue of transactions; sorting a first batch of transactions in the queue according to the determined sort order; notifying that the transactions in the first batch of transactions are ready for processing; sorting a further batch of transactions in the queue according to the determined sort order; notifying that the transactions in the further batch are ready for processing; and continuing to sort and notify for further batches of the transactions in the queue until the transactions in the queue have been sorted and the notifying is performed.

In accordance with another aspect of the invention, a method of managing a queue of transactions for processing is provided. The method includes determining a sort order for the queue of transactions; sorting a first batch of transactions in the queue according to the determined sort order; notifying that the transactions in the first batch of transactions are ready for processing; sorting a further batch of transactions in the queue according to the determined sort order; notifying that the transactions in the further batch are ready for processing; and continuing to sort and notify for further batches of the transactions in the queue until the transactions in the queue have been sorted and the notifying is performed.

In accordance with yet another aspect of the invention, a computer program product for managing a queue of transactions for processing is provided. The computer program product includes a computer readable storage medium readable by a processing circuit and storing instructions for execution by the processing circuit for performing a method. The method includes determining a sort order for the queue of transactions; sorting a first batch of transactions in the queue according to the determined sort order; notifying that the transactions in the first batch of transactions are ready for processing; sorting a further batch of transactions in the queue according to the determined sort order; notifying that the transactions in the further batch are ready for processing; and continuing to sort and notify for further batches of the transactions in the queue until the transactions in the queue have been sorted and the notifying is performed.

BRIEF DESCRIPTION OF THE DRAWINGS

Embodiments of the present invention will now be described, by way of example only, with reference to the following drawings in which.

DETAILED DESCRIPTION

Figure 1A:
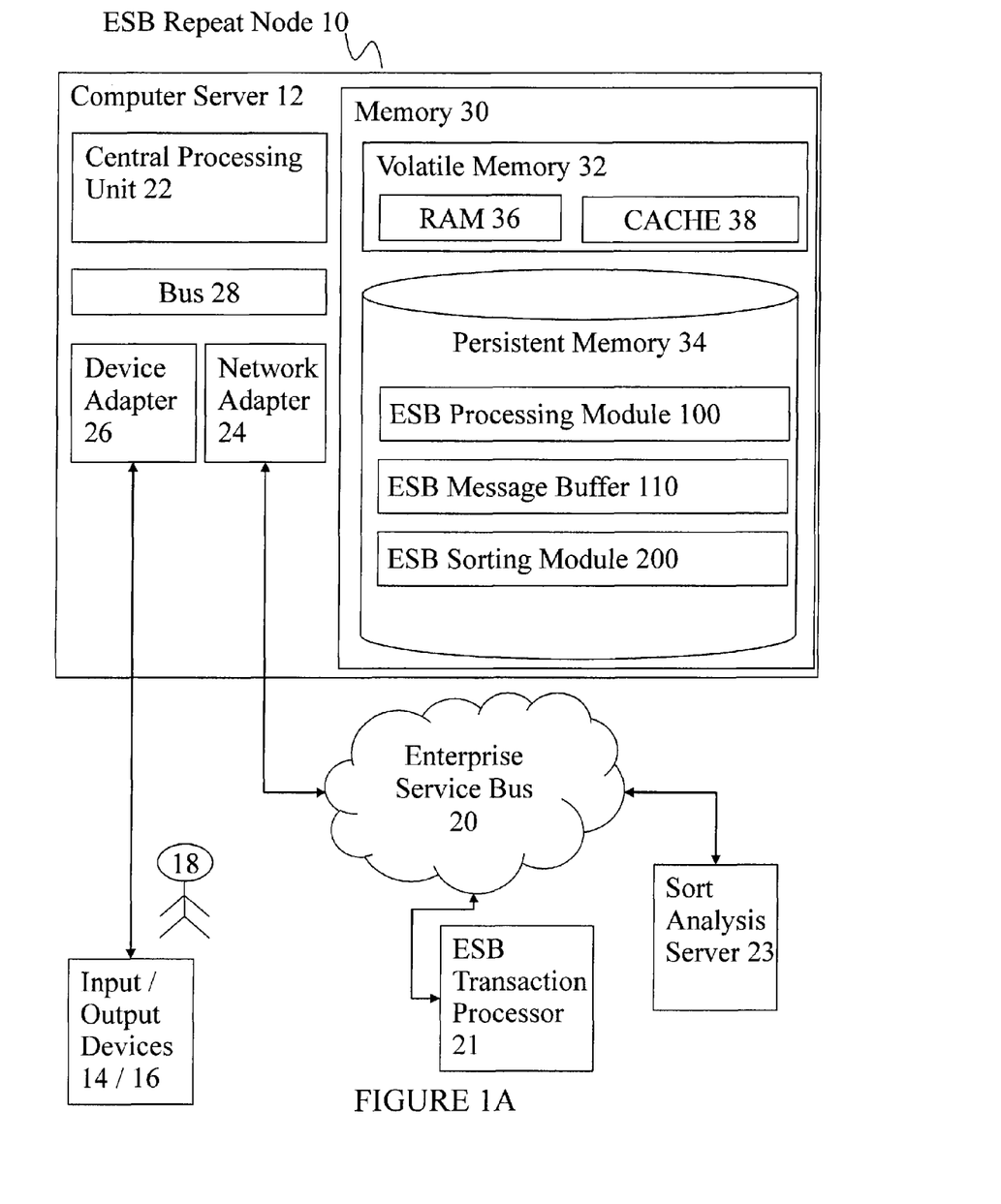
FIG. 1A is one example of a deployment diagram of one embodiment in a repeat node of an enterprise service bus (ESB), in accordance with one or more aspects of the present invention.

Referring to FIG. 1A, the deployment of one embodiment in an enterprise service bus (ESB) repeat node 10 is described. ESB repeat node 10 is operational with numerous other general purpose or special purpose computing system environments or configurations. For a typical ESB implementation, the ESB has a runtime to which a message flow is deployed. The flow is composed on a number of logical processing nodes including: input nodes that receive input from a plurality of transport protocols; and output nodes that transmit data over the transport protocols. Between the input nodes and the output nodes the message flow is comprised of further nodes each executing particular logic when invoked during processing through the flow. One such further node is a repeat node that can invoke subsequent logic paths multiple times over based on configuration or content of the inbound message. Examples of well-known computing processing systems, environments, and/or configurations that may be suitable for use with ESB repeat node 10 include, but are not limited to, personal computer systems, server computer systems, multiprocessor systems, microprocessor-based systems, network PCs, minicomputer systems, mainframe computer systems, and distributed computing environments that include any of the above systems or devices. A distributed computer environment includes a cloud computing environment for example where a computer processing system is a third party service performed by one or more of a plurality of computer processing systems. A distributed computer environment also includes an Internet of Things computing environment for example where computer processing systems are distributed as a network of objects that can interact with a computing service.

ESB repeat node 10 may be described in the general context of computer system-executable instructions, such as program modules, being executed by a computer processor. Generally, program modules may include routines, programs, objects, components, logic, and data structures that perform particular tasks or implement particular abstract data types. ESB repeat node 10 may be embodied in distributed cloud computing environments where tasks are performed by remote processing devices that are linked through a communications network. In a distributed cloud computing environment, program modules may be located in both local and remote computer system storage media including memory storage devices.

ESB repeat node 10 comprises, for instance: general-purpose computer server 12 and one or more input devices 14 and output devices 16 directly attached to the computer server 12. ESB repeat node 10 communicates with a user 18 using input devices 14 and output devices 16. Input devices 14 include one or more of: a keyboard, a scanner, a mouse, trackball or another pointing device. Output devices 16 include one or more of a display or a printer. ESB repeat node 10 is connected to an enterprise service bus (ESB) 20. ESB repeat node 10 communicates with network devices (not shown) over ESB 20.

ESB transaction processor 21 is connected to the ESB repeat node 10 through ESB 20 and is for processing transactions or other elements.

Sort analysis server 23 is connected to the ESB repeat node 10 through ESB 20 and is for providing priority analysis for elements.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively, a machine code program, such as a virtual machine or an interpreter, can interpret a high level language in terms of machine operations.

Network adapter 24 is connected to bus 28 and ESB 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally, volatile memory is used because it is faster, and generally, non-volatile memory is used because it will hold the data for longer. ESB repeat node 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk, such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The program modules configured to carry out the functions of one embodiment comprises: ESB processing module 100; ESB message buffer 110; and ESB sorting module 200. In one embodiment, ROM in memory 30 stores module 200 that enables the computer server 12 to function as a special purpose computer specific to module 200. Further program modules that support one or more embodiments but are not shown include firmware, a boot strap program, an operating system, and support applications. Each of the operating system, support applications, other program modules, and program data or some combination thereof, may include an implementation of a networking environment.

ESB processing module 100 is, when loaded into volatile memory, for controlling the processor 22 to process an ESB message as stored in the ESB message buffer 110.

ESB message buffer 110 is for storing an ESB message received over ESB 20.

ESB sorting module 200 is, when loaded into volatile memory, for controlling processor 22 to perform a sort operation on the ESB message in ESB message buffer 110 according to one or more embodiments.

Figure 1B:
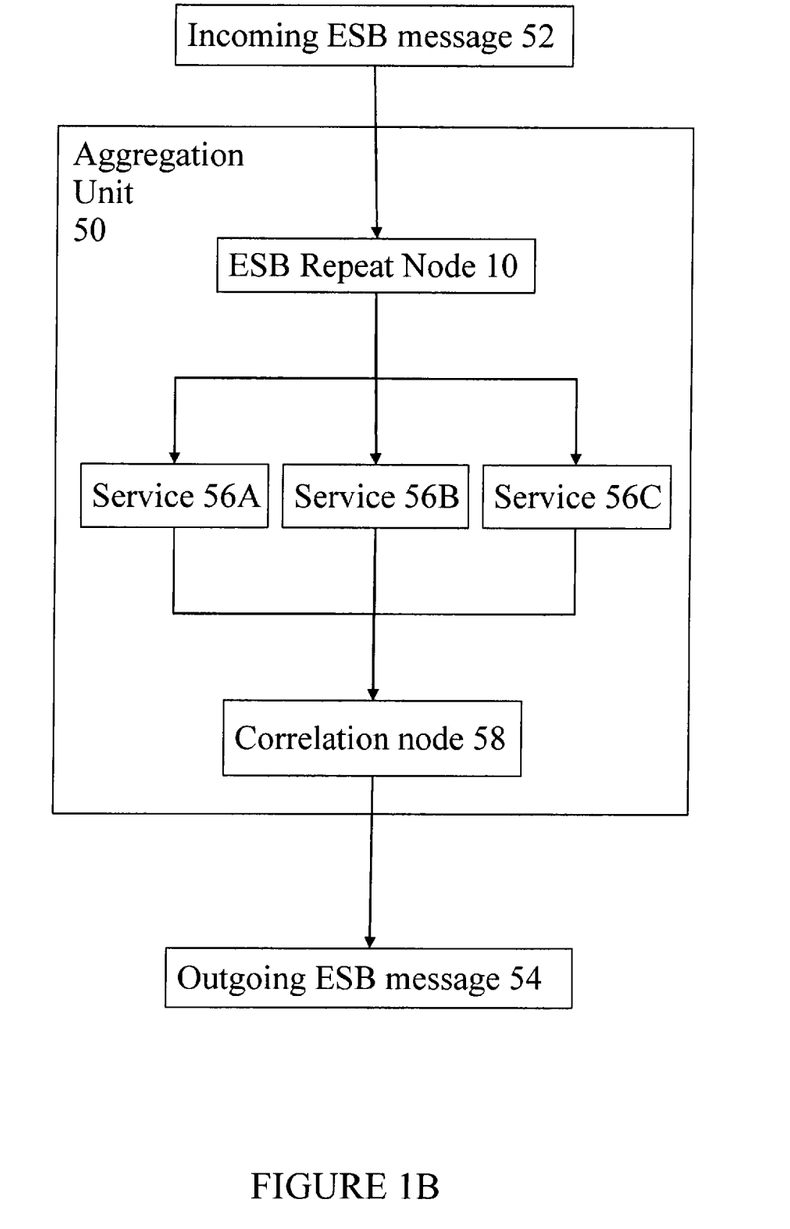
FIG. 1B is one example of a deployment diagram of one embodiment of a repeat node as part of a signal aggregation unit in an enterprise service bus (ESB), in accordance with an aspect of the present invention.

Referring to FIG. 1B, an ESB deployment of repeat node 10 as part of an aggregation unit 50 in an enterprise service bus (ESB) system is described. Aggregation unit 50 can be a real or virtual collection of components comprising: ESB repeat node 10; service nodes 56A, 56B, and 56C; and correlation node 58. Messages including incoming ESB message 52 is input to ESB repeat node 10 where they are directed to one of the service nodes 56A, 56B and 56C for processing according to the content of the message. In this example, the repeat node 10 is part of an aggregation unit, in that the results of processing each of the service nodes are collected back by correlation node 58 into a single outgoing message 54. This is a simple example for illustrative purposes only and in other examples, the results would not be collected together.

Figure 2:
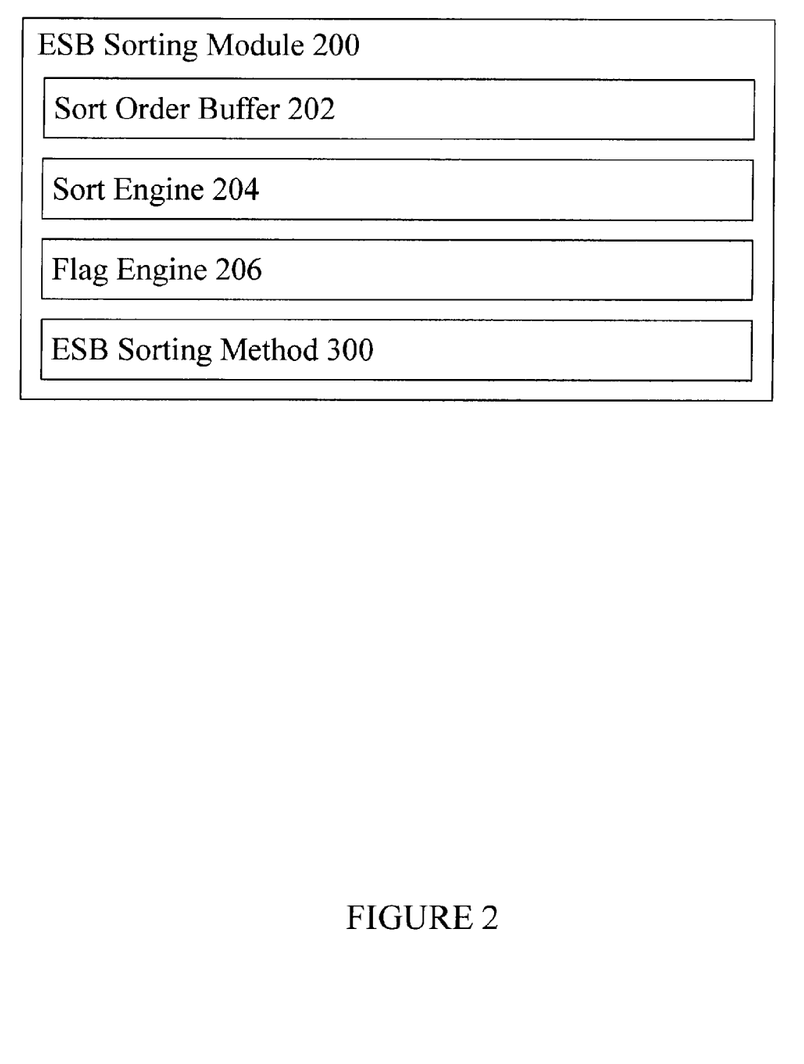
FIG. 2 is one example of a component diagram of one embodiment, in accordance with one or more aspects of the present invention.

Referring to FIG. 2, ESB sorting module 200 comprises the following components, in one example: sort order buffer 202; sort engine 204; flag engine 206; and ESB sorting method 300.

Sort order buffer 202 is for storing a defined sort order for the queue of transactions. Sort order buffer 202 is a function name and represents any component that is for storing a defined sort order for the queue of transactions and such a component may be any type of component or sub-components, such as a register or memory location.

Sort engine 204 is for sorting a first batch of transactions according to the defined sort order and for sorting a further batch of transactions according to the defined sort order. Sort engine 204 is a function name for any component or sub-component that is for sorting a first batch of transactions according to the defined sort order and for sorting a further batch of transactions according to the defined sort order.

Flag engine 206 is for notifying that the transactions within the first batch are ready for processing (because they are sorted) and for notifying that the further batch of transactions are ready for processing (because they are sorted). Flag engine 206 is a function name and represents any component or sub-component that is for notifying that the transactions within the first batch are sorted and for notifying that the further batch of transactions is sorted. Flagging a transaction is one type of notification where the flagged transaction is pulled by a transaction processor. Sending a transaction message (containing a transaction or an identification of a transaction) is another type of notification, such that the transaction is or can be pushed to a transaction processor.

ESB sorting method 300 is for continuing to sort and notify for further batches of the transactions until all the transactions in the queue have been sorted and notified as ready for processing (because they are sorted). ESB sorting method 300 is a function name and represents any component or sub-component that is for continuing to sort and flag for further batches of the transactions until all the transactions in the queue have been sorted and flagged as sorted. ESB sorting method 300 comprises ESM sorting method 300A in one embodiment. In an alternative embodiment, ESB sort controller 300 comprises ESM sorting method 300B.

The described embodiments describe functionality within a repeat node to enable appropriate sorting of the elements and potential interoperability with external analytics systems for scoring. The described embodiments allow better control over aggregation and repeat node processing. The described embodiments allow higher priority elements within a batch to be processed first based on business need. The described embodiments allow additional control and available functions. However, some embodiments may not have these potential advantages and these potential advantages are not necessarily required of all embodiments.

Figure 3A:
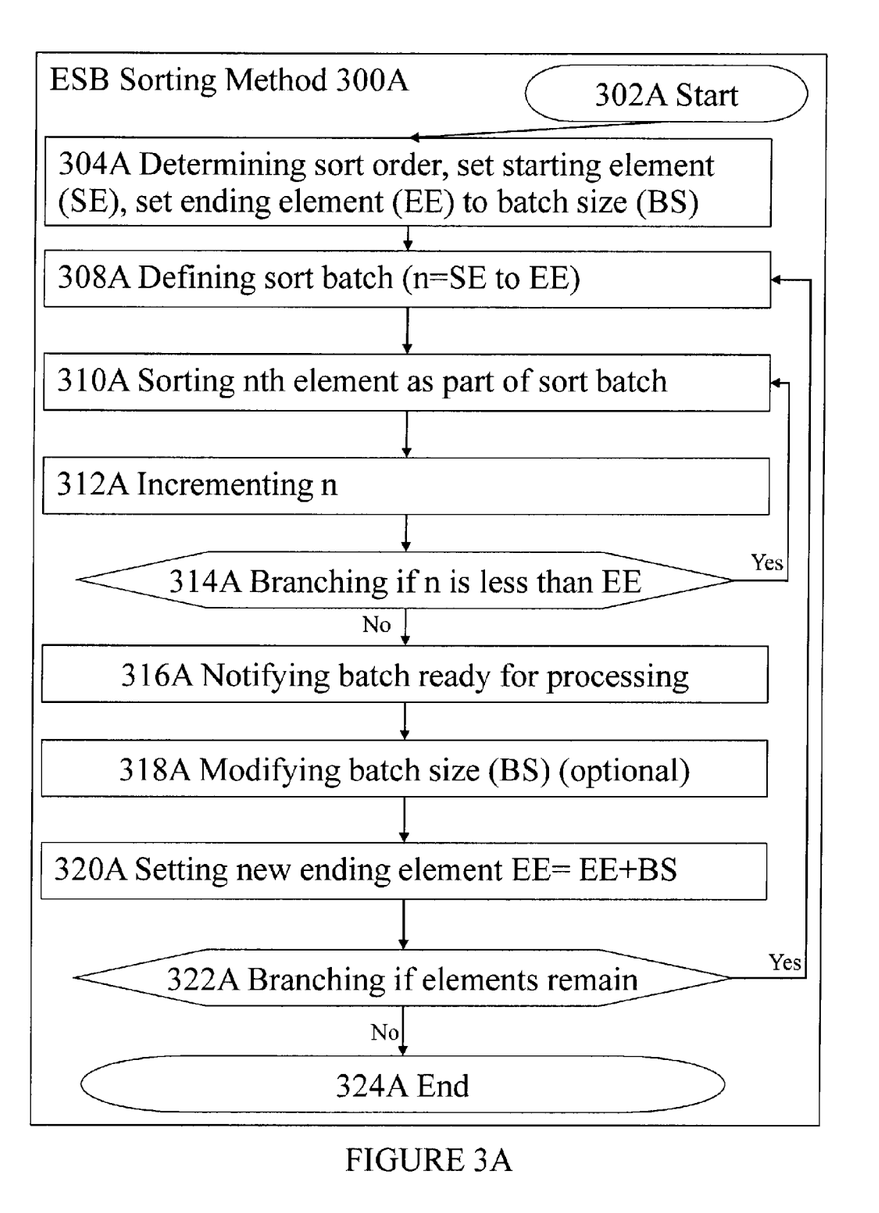
FIGS. 3A and 3B are flow diagrams of a process of one embodiment and an alternative embodiment, respectively, in accordance with one or more aspects of the present invention.

Referring to FIG. 3A, one embodiment of an ESM sorting method 300A comprises logical process steps 302A to 324A. Although there is an order to steps as described, the steps may not necessarily need to be in this order and in other embodiments steps can be in a different order.

Step 302A is the start of the method when initiated by the ESB repeat node 10.

Step 304A is for determining a sort order, and setting the starting element (SE) and setting the ending element (EE) to a batch size (BS). An element is a position in the queue of transactions.

Step 308A is for defining a sort batch (n=SE to EE).

Step 310A is for sorting the transaction at the nth element as part of a sort batch. In one embodiment, a bubble algorithm is performed, but many other sorting algorithms would work.

Step 312A is for incrementing n.

Step 314A is for branching to step 310A, if n is less than the ending element (EE).

Step 316A is for notifying that a batch is ready for processing (because it is sorted). Generally, the notification is for the attention of the ESB transaction processor 21. In one embodiment, notifying is by a push notification to the ESB transaction processor, but the ESB transaction processor 21 could pull a flag notification from or check a flag in ESB sorting module 200.

Step 318A is for optionally modifying the batch size (BS). When the system determines the appropriate values during processing, it is achieved by sorting the first transactions to determine an average "scoring time", processing a first transaction to get an approximate "processing time", scanning the message to identify the number of transactions to process and referring to the application policy for service level agreement (SLA) requirements. The "scoring time" and "processing time" could be compared to identify an appropriate number of transactions to score and rank per synchronization point that would still meet the SLA for the number of transactions in the batch. For example, given the following; Number of transactions=1,000,000; SLA=9 hours; Scoring Time=0.02 seconds per transaction; Processing Time=0.03 seconds per transaction. If scoring and processing was performed sequentially the total time to complete would be (0.02+0.03)*1,000,000=50,000 seconds (13.89 hours). However, calculating an appropriate batch size to fit within the SLA and provide some headroom—allowing for 5% (8.55 hours)—then: ((SLA*(1−headroom))−totalProcessingTime)/IndividualScoringTime=Batch Size. (50,000*(1−0.05))−30,000/0.02=39,000. With a batch size of 39,000, one may first score/rank the first batch (taking 39000*0.02=780 seconds) and can then start processing and scoring/ranking in parallel. This would reduce the total time to complete from 13.89 hours to 8.55 hours (780 seconds+(1,000,000*0.03 seconds)) which should then fit within the SLA allowing for the stated 5% headroom. The step should continue during the scoring and processing to ensure the SLA is met. In one embodiment, ESB sorting module 200 can determine how many transactions of the previous batch have been processed at the time that a new batch is created. If the whole of the previous batch has been processed, then the new batch size is incremented. If some of the previous batch have not been processed, then the new batch size is decremented.

Step 320A is for setting a new ending element by incrementing by the batch size (EE=EE+BS).

Step 322A is for branching to step 308A, if there are elements remaining.

Step 324A is the end of the method.

Figure 3B:
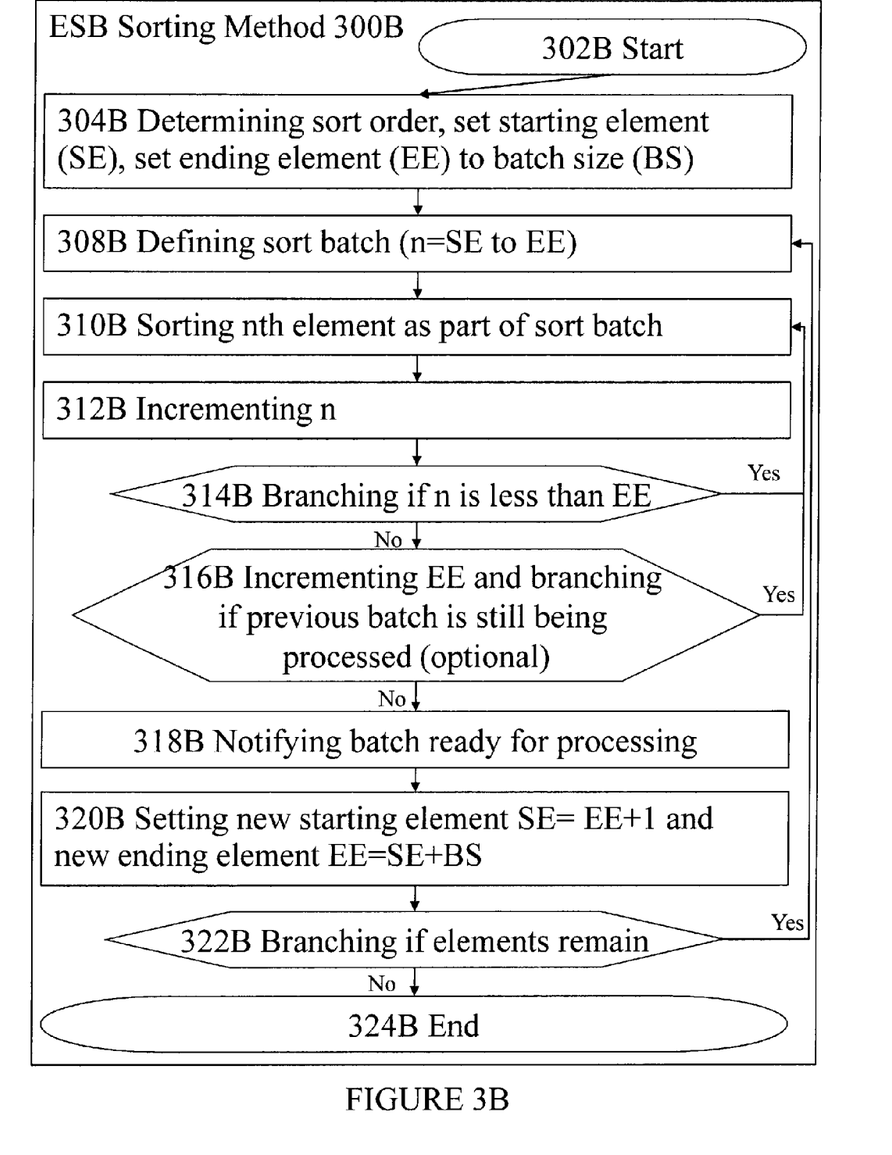

Referring to FIG. 3B, an alternative embodiment of ESM sorting method 300B comprises logical process steps 302B to 324B. Although there is an order to the steps as described, the steps may not necessarily need to be in this order and in other embodiments steps can be in a different order.

Step 302B is the start of method 300B when initiated by the repeating node.

Step 304B is for determining a sort order, and setting a starting element (SE) and setting an ending element (EE) to a batch size (BS).

Step 308B is for defining a sort batch (n=SE to EE).

Step 310B is for sorting the nth element in the queue as part of the sort batch.

Step 312B is for incrementing n.

Step 314B is for branching to step 310B, if n is less than EE.

Step 316B is for incrementing EE and branching to step 310B, if the previous batch is still being processed (optional step).

Step 318B is for notifying of a sorted batch.

Step 320B is for setting a new starting element SE=EE+1 and a new ending element EE=SE+BS.

Step 322B is for branching to step 308B, if elements remain.

Step 324B is the end of method 300B.

Figure 4:
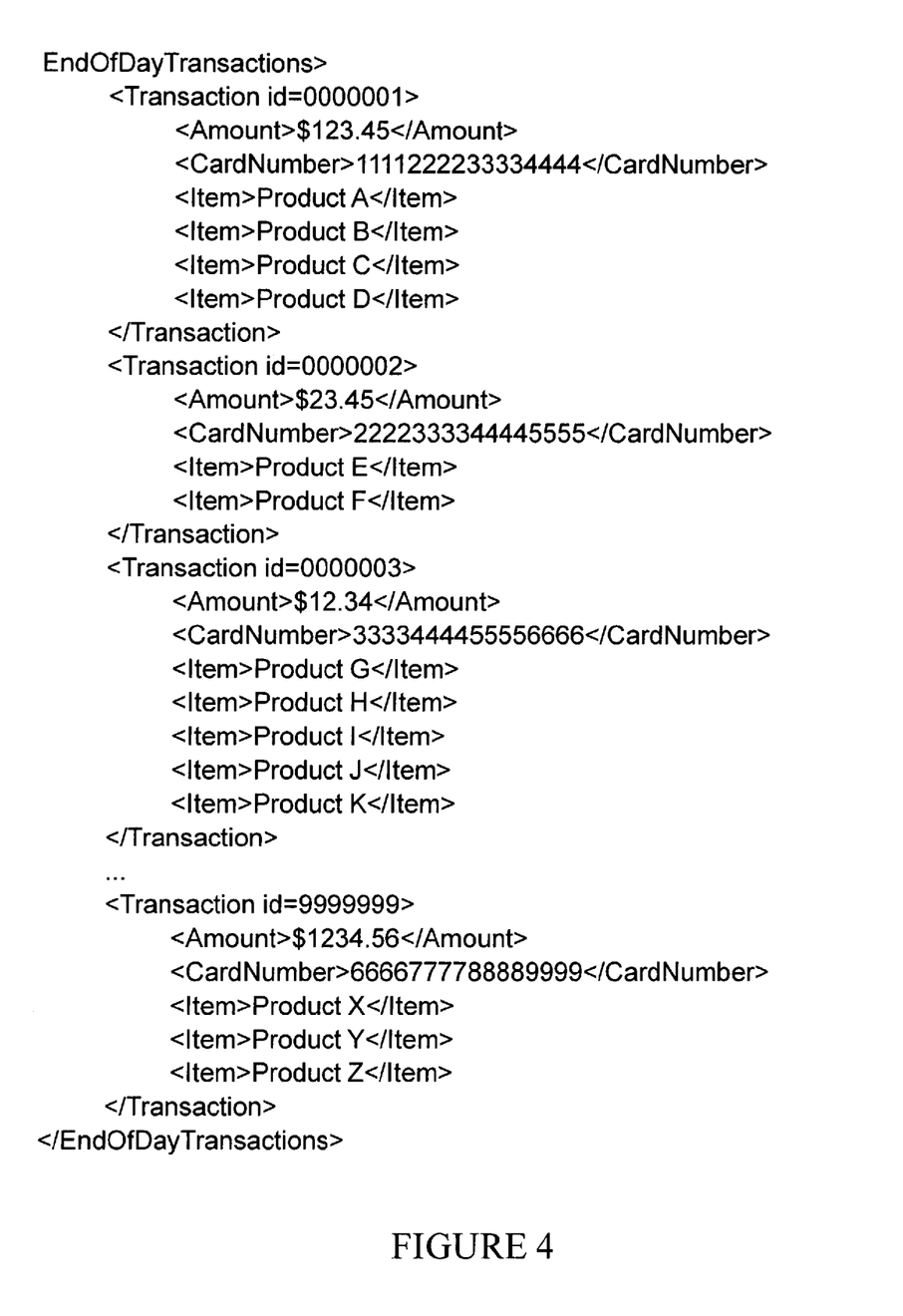
FIG. 4 is an example queue of transactions, in accordance with one or more aspects of the present invention.

Referring to FIG. 4, an example set of transactions in a queue is described. The queue comprises 9999999 elements containing transactions logged at the end of a day. Each transaction is defined between a pair of repeating transaction tags <Transaction . . . > . . . </Transaction> and identified with a number in a series from element 1 (transaction id=0000001) to element 9999999 (transaction id=9999999). Between the transaction tags each transaction comprises repeating fields: amount (in $) (<Amount>$123.45</Amount>); card number <CardNumber>1111222233334444</CardNumber>; and item number or numbers (for example <Item>Product A</Item>). These repeating fields are used by the processing module to perform logical operations.

Only a few of the 9999999 transactions are shown in FIG. 4. Transaction id=0000001 comprises a transaction for $123.45 for Product items A, B, C and D using card number is 1111222233334444. Transaction id=0000002 comprises a transaction for $23.45 for Product items E and F using card 2222333344445555. Transaction id=0000003 for $12.34 for product items G, H, I, J and K uses card 3333444455556666. Transaction id=0000004 to transaction id=9999998 are not shown in FIG. 4. Transaction id=9999999 for $1234.56 for product items X, Y and Z uses card 6666777788889999.

In a simple sort definition example, an administrator wants to process the transactions with a highest value first. In this instance, the definition would comprise an "Amount" or "Transaction/Amount" and specify highest to lowest (potentially through a check box). The repeat node would then order the transactions accordingly prior to processing; so, in the above case, it would process the transactions in the following order:

| Transaction id = 9999999 | $1234.56 |
| Transaction id = 0000001 | $123.45 |
| Transaction id = 0000002 | $23.45 |
| Transaction id = 0000003 | $12.34 |

Alternatively, an administrator may want to process transactions based on their size in some way, in which case they may order by the number of "Items" in the "Transaction" (count(/Transaction/Item)). In this way, the integration is likely to process a larger proportion of messages first as it will be able to process the smaller transactions faster. In this case, the repeat node would process the elements in the following order:

| Transaction id = 0000002 | 2 items |
| Transaction id = 9999999 | 3 items |
| Transaction id = 0000001 | 4 items |
| Transaction id = 0000003 | 5 items |

Another alternative is that an administrator or the user may want to process the transactions by likelihood of fraud; in this case, the repeat node can request an analytics engine to provide a score for each element based on a defined model. In this example, the products brought, amount spent etc. may indicate that the transactions are processed in the following order due to a likelihood of fraud:

| Transaction id = 9999999 | 80% |
| Transaction id = 0000002 | 60% |
| Transaction id = 0000003 | 40% |
| Transaction id = 0000001 | 30% |

The use of synchronization points within the sorting and processing means that, if there are for example 1,000,000 transactions and the sorting algorithm was timely, the processing records could be started whilst waiting for the additional scoring to complete. An example of this would be processing a batch job of daily transactions overnight (a single message with 1,000,000 elements say). The priority for the transaction processing (each transaction) may be based on transaction amount and probability of fraud (in one embodiment, process these first). Sorting based on transaction amount alone would be relatively quick with a simple message parse; however, for fraud detection, an external service may need to be invoked. In this case, assessing the likelihood of fraud may take considerably longer per transaction. In this case, it would be more efficient to start the message processing before the ranking for every transaction is available—for instance, once the first 1,000 transactions have been scored, then processing could begin whilst scoring remaining elements continues. Once the next 1,000 have been ordered, there is another synchronization point and the list of ordered elements available for processing is augmented. This enables processing to start on vaguely ordered data, with the ordering improving on each synchronization point. Synchronization points could be defined by an administrator.

Figure 5A:
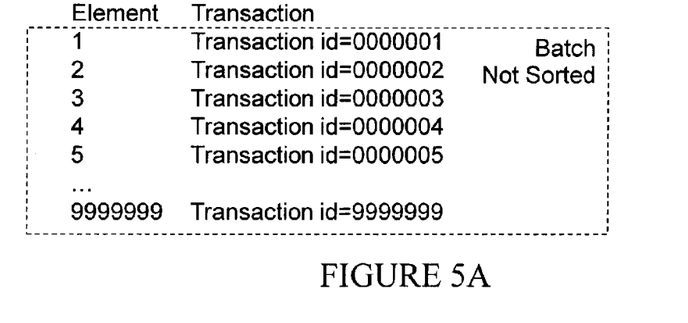
FIGS. 5A, 5B and 5C are example states of a transaction queue after performance of one embodiment, in accordance with one or more aspects of the present invention.
Figure 5B:
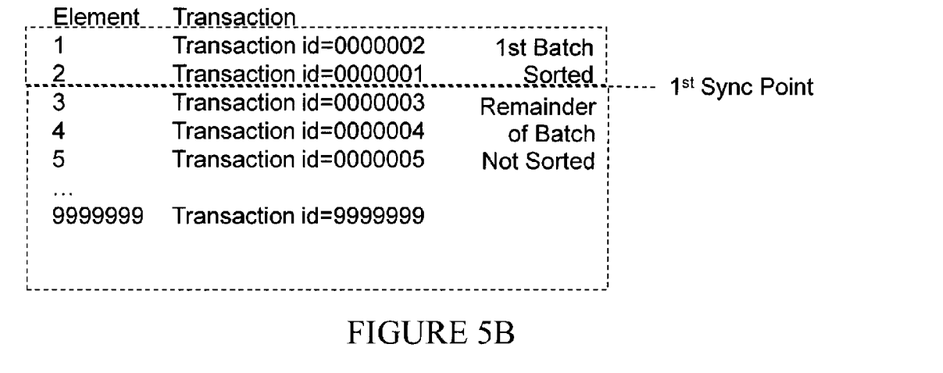
Figure 5C:
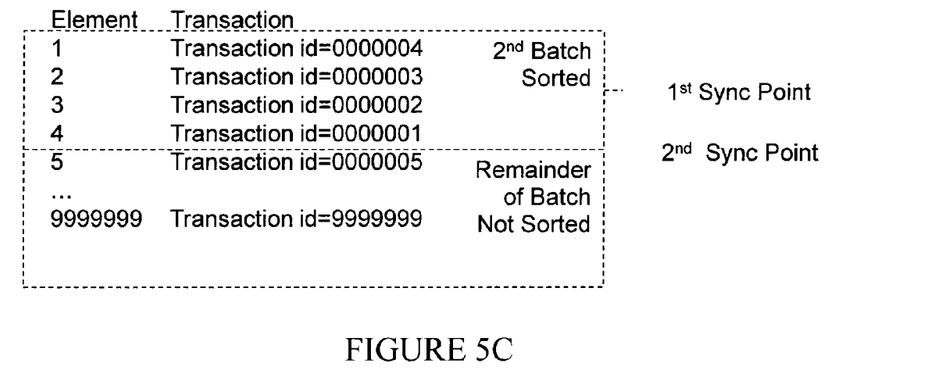

Referring to FIGS. 5A, 5B and 5C, example states of a transaction batch sort of one embodiment is described.

FIG. 5A shows the queue of transactions in the batch sorted in ascending order (that is not sorted in the defined descending order) corresponding to queue elements (1 to 99999999) that are fixed in ascending order. Step 304A determines that the defined sort order is descending order for the transaction id by checking a predefined sort order system variable or a pre-defined administrator or user defined variable. Step 304A also sets the starting element (SE) at element 1, and sets the ending element (EE) to element 2 due to a defined batch size (BS) of 2. Steps 308A to 314A will sort the first two elements and effectively allow the transaction at the second element (transaction id=0000002) to rise to the top of the batch as shown in FIG. 5B.

FIG. 5B shows the queue from FIG. 5A with a first batch (transaction id=00000002 and transaction id=0000001) of the queue sorted in descending order and up for processing. The remainder transactions (transaction id=0000003 to transaction id=9999999) are not shown sorted in descending order. Step 316A flags the first batch as sorted while the remainder of the batch is not sorted (as indicated in the text of FIG. 5B). The first synchronization point is after the second queue element and before the third queue element (transaction id=0000001 and transaction id=0000003 respectively in FIG. 5B). A synchronization point is a point in the sort batch that defines that part of the sort batch that is sorted and that part which is not sorted. This allows the processing module to start processing transactions before all of the transactions have been sorted. Step 320A sets a new ending element (EE=4) from the old ending element transaction (EE=2) plus the batch size (BS=2). Step 322A branches to step 308A because there are more elements to be processed. Steps 308A to 314A will sort the next two transactions and effectively allow transaction id=0000003 and then transaction id=0000004 to rise to the top of the batch as shown in FIG. 5C.

FIG. 5C shows the queue from FIG. 5B with a second batch (Elements 1 to 4, and transaction id=0000004, transaction id=0000003, transaction id=0000002 and transaction id=0000001, respectively, sorted in descending order) of the queue sorted and ready for processing. The remainder of the elements (elements 5 to 9999999, and transaction id=0000005 to transaction id=9999999, respectively) are not sorted in the determined order. The starting transaction is the first element in the queue. A new second synchronization point is after the fourth element and before the fifth element. Step 316A flags the second batch as sorted, while the remainder of the batch is not sorted (as indicated in the text of FIG. 5C). The second synchronization point is after the fourth transaction and before the fifth transaction. Step 318A increases the batch size to four elements (BS=4) and step 320A sets a new ending element (EE=6). Step 322A branches to step 308A because there are more transactions to be processed. Steps 308A to 314A will sort the next two transactions effectively allowing transaction id=0000005 and then transaction id=00000006 to rise to the top of the batch (not shown).

The processing module will start processing the first batch once it is notified as ready for processing by the sorting module. When a second batch is flagged, the processing module will finish processing transactions in the first batch that it has started in one embodiment and the processing module will ignore any transactions in the new batch that it has already processed. However, the processing module could finish processing all of the transactions in the old batch before starting a new flagged and sorted batch.

Figure 6A:
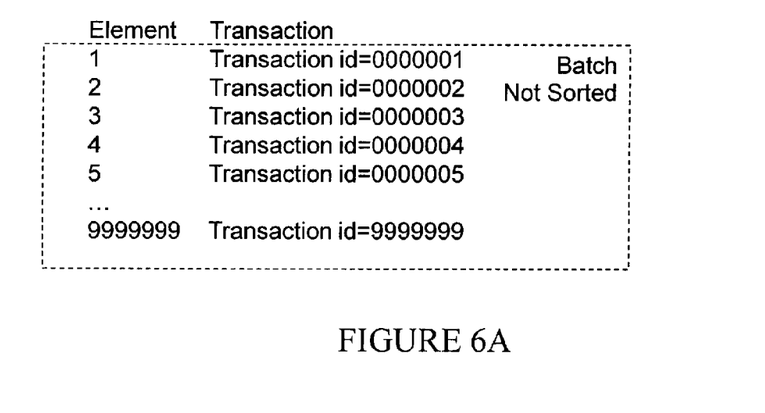
FIGS. 6A, 6B and 6C are example states of a transaction queue after performance of the alternative embodiment, in accordance with one or more aspects of an present invention.
Figure 6B:
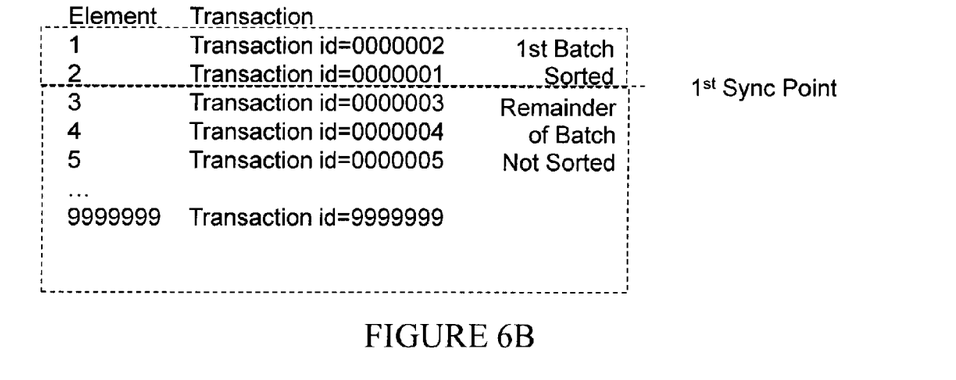
Figure 6C:
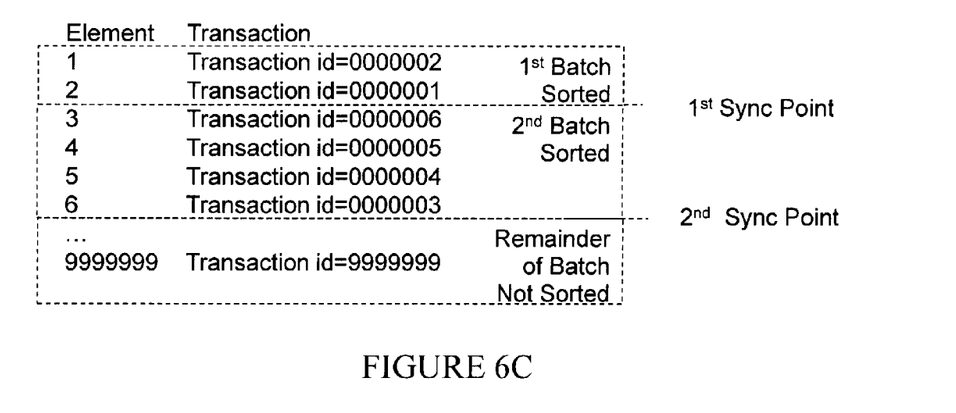

Referring to FIGS. 6A, 6B and 6C, example states of a transaction batch sort for an alternative embodiment are described.

FIG. 6A shows the complete queue of transactions in the batch and not sorted in a defined descending order (the example is sorted in an ascending order). Step 304B determines that the defined sort order is descending order for the transaction id (FIG. 6A is sorted in an ascending order), sets the starting element (SE) at 1, and sets the ending element (EE) to a batch size (BS) of 2. Steps 308B to 314B will sort the first two elements effectively allowing transaction id=0000002 to rise to the top of the batch as shown in FIG. 6B.

FIG. 6B show the queue from FIG. 6A with a first batch (transaction id=0000002 and transaction id=0000001 sorted in descending order) of the queue sorted and ready for processing. The remainder transactions (transaction id=0000003 to transaction id=9999999) are not yet sorted in the defined order. The starting transaction is the third queue element and the batch size is two elements. Step 316B notifies that the first batch is sorted, while the remainder of the batch is not sorted (as indicated in the text of FIG. 6B). The first synchronization point is after the second element and before the third element. A synchronization point is a point in the sort batch that defines that part of the sort batch that is sorted and that part which is not sorted. This allows the processing module to start processing elements before all of the transactions have been sorted. Step 318B notifies the transaction processor 21 that the batch is ready for processing (not shown in example). Step 320B sets a new starting element SE=EE+1=3 and a new ending element EE=SE+BS=5 where batch size (BS=2). Step 322B branches to step 308B because there are more elements to be processed. Steps 308B to 314B will sort the next two transactions effectively allowing transaction id=0000004 to rise to the top of the batch. However, in this example, step 316B kicks in because the processing module is still processing and EE is incremented by 2 to EE=7 (effectively increasing the batch size; although in this case, the defined batch size variable itself is not changed). The first synchronization point is after the second element and before the third element. Steps 308B to 314B will continue to sort the next two transactions effectively allowing transaction id=0000005 and transaction id=0000006 to rise to the top of the second batch, as seen in FIG. 6C.

FIG. 6C shows the queue from FIG. 6B with a second batch flagged as sorted and ready for processing. The remainder of the transactions (transactions 7-1000000) are not sorted in the defined order. The starting transaction is the third element in the queue and the batch size is now 4 transactions. A new second synchronization point is after the sixth element and before the seventh element (not shown).

In an alternative embodiment sort batches are exclusive and non-overlapping. At this stage, the processing module will have already started processing the first batch and will probably finish processing the first batch before starting on the second batch.

As described herein, in one aspect of the invention, there is provided a system for managing a queue of transactions for processing. The system comprises: a sort order buffer for storing a defined sort order for the queue of transactions; a sort engine for sorting a first batch of transactions in the queue according to the defined sort order and for sorting a further batch of transactions according to the defined sort order; a batch flag engine for notifying that the transactions within the first batch are ready for processing and for notifying that the further batch of transactions are ready for processing; and a sort controller for continuing to sort and notify for further batches of the transactions until all the transactions in the queue have been sorted and notified as ready for processing.

In another aspect of the invention, there is provided a method for managing a queue of transactions for processing. The method comprises: determining a sort order for the queue of transactions; sorting a first batch of transactions in the processing queue according to the determined sort order; notifying that the transactions within the first batch are ready for processing; sorting a further batch of transactions in the queue according to the determined sort order; notifying that the transaction in the further batch are ready for processing; and continuing to sort and notify for further batches of the transactions in the queue until all the transactions in the queue have been sorted and notifying as ready for processing.

One embodiment is described in terms of a method that is transparent to whatever transaction processing is used and is described in terms of sorting a batch of transactions. However, other embodiments might not operate transparently from the transaction processing operations and would attribute each transaction with a score and process a batch of transactions in order of the score without sorting. Another embodiment could attribute a score to each transaction in the batch that allows the transactions to be sorted according to the score after the scoring method and before processing.

A queue can be any type of set of transactions and a batch can be any type of subset of the set. Transactions within each transaction batch are considered and processed independently in order according to the sort.

In one embodiment, a synchronization point is defined to mark the sorted batch of transactions and the remaining unsorted transactions in the queue.

One example further comprises processing transactions in the transaction queue that are notified as ready for processing.

In one embodiment, the sorting of transactions comprises scoring each transaction and further comprising processing transactions in the transaction queue that are notified as ready for processing in order of transaction score. Further, the scoring of each transaction uses a scoring definition based on one of more values from each transaction. Scoring each transaction may also comprise requesting a score for each transaction from an external score analysis service.

Yet further a batch size is modified to optimize batch sorting and processing.

In one example, the first batch is a part of the further batch and the further batch is part of a subsequent further batch.

As a further example, the first and further batches are adjacent and do not overlap.

In yet another embodiment, each batch is a single message and each transaction is an element within that message.

In a further aspect of the invention, there is provided a computer program product for managing a processing queue of transactions. The computer program product comprises a computer readable storage medium having program instructions embodied therewith, the program instructions executable by a processor to cause the processor to determine a sort order for the queue of transactions; sort a first batch of transactions in the queue according to the determined sort order; notify that the transactions within the first batch are sorted; sort a further batch of transactions in the queue according to the determined sort order; notify that the further batch of transactions is sorted; and continue to sort and notify for further batches of the transactions until all the transactions in the queue have been sorted and notify as sorted.

Further embodiments of the invention are now described. It will be clear to one of ordinary skill in the art that all or part of the logical process steps of one embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one or more embodiments may be alternatively embodied in logic apparatus comprising logic elements to perform the steps of the method, and that such logic elements may comprise components, such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, one or more aspects of the present invention may be realized in the form of a computer implemented method of deploying a service comprising steps of deploying computer program code operable to, when deployed into a computer infrastructure and executed thereon, cause the computer system to perform the steps of the method.

It will be appreciated that the method and components of one or more embodiments may alternatively be embodied fully or partially in a parallel computing system comprising two or more processors for executing parallel software.

A further embodiment of the invention is a computer program product defined in terms of a system and a method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

One or more aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiments without departing from the scope of aspects of the present invention.

What is claimed is:

1. A computer system for managing a queue of transactions for processing, the computer system comprising:
   a memory; and
   a processing device in communication with the memory, wherein the computer system is configured to perform a method, said method comprising:
      determining a sort order for the queue of transactions, wherein the queue comprises a plurality of transactions;
      sorting a first batch of transactions, wherein the first batch of transactions comprises a first group of transactions of the plurality of transactions in the queue, wherein the sorting is according to the determined sort order, and wherein the sorting comprising defining a first synchronization point in the queue to differentiate the sorted first batch of transactions from transactions of the plurality of transaction not in the first batch;
      notifying that the transactions in the first batch of transactions are ready for processing;
      commencing processing, in the determined sort order, the first group of transactions in the first batch;
      concurrent to the commencing processing, sorting a further batch of transactions in the queue according to the determined sort order, wherein the further batch of transactions comprises a second group of transactions of the plurality of transactions, and wherein the second group of transactions comprises unprocessed transactions in the first group of transactions, and wherein the sorting comprising defining a further synchronization point in the queue to differentiate the sorted further batch of transactions from transactions of the plurality of transaction not in the in the first batch or in the further batch;
      notifying that the transactions in the further batch are ready for processing;
      commencing processing, in the determined sort order, the second group of transactions in the further batch; and
      concurrent to the commencing processing of the further batch, continuing to sort, notify, and commence processing for further batches of the transactions in the queue until the plurality of transactions in the queue have been sorted and the notifying is performed.

2. The computer system according to claim 1, wherein the method further comprises processing transactions in the transaction queue that are ready for processing.

3. The computer system according to claim 1, wherein the sorting of at least one of the first batch of transactions or the further batch of transactions comprises scoring each transaction in a batch of transactions, and the processing transactions in the queue comprises processing transactions in order of score.

4. The computer system according to claim 3, wherein the scoring each transaction comprises uses a scoring definition based on one of more values from each transaction.

5. The computer system according to claim 3, wherein the scoring each transaction comprises requesting a score for each transaction from an external score analysis service.

6. The computer system according to claim 1, wherein the method further comprises modifying a batch size to optimize batch sorting and processing.

7. The computer system according to claim 1, wherein each batch is a single message and each transaction is an element within that single message.

8. A method of managing a queue of transactions for processing, the method comprising:
   determining a sort order for the queue of transactions, wherein the queue comprises a plurality of transactions;
   sorting a first batch of transactions, wherein the first batch of transactions comprises a first group of transactions of the plurality of transactions in the queue, wherein the sorting is according to the determined sort order, and wherein the sorting comprising defining a first synchronization point in the queue to differentiate the sorted first batch of transactions from transactions of the plurality of transaction not in the first batch;
   notifying that the transactions in the first batch of transactions are ready for processing;
   commencing processing, in the determined sort order, the first group of transactions in the first batch;
   concurrent to the commencing processing, sorting a further batch of transactions in the queue according to the determined sort order, wherein the further batch of transactions comprises a second group of transactions of the plurality of transactions, and wherein the second group of transactions comprises unprocessed transactions in the first group of transactions, and wherein the sorting comprising defining a further synchronization point in the queue to differentiate the sorted further batch of transactions from transactions of the plurality of transaction not in the in the first batch or in the further batch;
   notifying that the transactions in the further batch are ready for processing;
   commencing processing, in the determined sort order, the second group of transactions in the further batch; and
   concurrent to the commencing processing of the further batch, continuing to sort, notify, and commence processing for further batches of the transactions in the queue until the plurality of transactions in the queue have been sorted and the notifying is performed.

9. The method according to claim 8, further comprising processing transactions in the transaction queue that are ready for processing.

10. The method according to claim 8, wherein the sorting of at least one of the first batch of transactions or the further batch of transactions comprises scoring each transaction in a batch of transactions, and the processing transactions in the queue comprises processing transactions in order of score.

11. The method according to claim 10, wherein the scoring each transaction comprises uses a scoring definition based on one or more values from each transaction.

12. A computer program product for managing a queue of transactions for processing, the computer program product comprising:
   a computer readable storage medium readable by a processing circuit and storing instructions for execution by the processing circuit for performing a method comprising:
      determining a sort order for the queue of transactions, wherein the queue comprises a plurality of transactions;
      sorting a first batch of transactions, wherein the first batch of transactions comprises a first group of transactions of the plurality of transactions in the queue, wherein the sorting is according to the determined sort order, and wherein the sorting comprising defining a first synchronization point in the queue to differentiate the sorted first batch of transactions from transactions of the plurality of transaction not in the first batch;
      notifying that the transactions in the first batch of transactions are ready for processing;
      commencing processing, in the determined sort order, the first group of transactions in the first batch;
      concurrent to the commencing processing, sorting a further batch of transactions in the queue according to the determined sort order, wherein the further batch of transactions comprises a second group of transactions of the plurality of transactions, and wherein the second group of transactions comprises unprocessed transactions in the first group of transactions, and wherein the sorting comprising defining a further synchronization point in the queue to differentiate the sorted further batch of transactions from transactions of the plurality of transaction not in the in the first batch or in the further batch;
      notifying that the transactions in the further batch are ready for processing;
      commencing processing, in the determined sort order, the second group of transactions in the further batch; and
      concurrent to the commencing processing of the further batch, continuing to sort, notify, and commence processing for further batches of the transactions in the queue until the plurality of transactions in the queue have been sorted and the notifying is performed.

13. The computer program product according to claim 12, wherein the method further comprises processing transactions in the transaction queue that are ready for processing.

14. The computer program product according to claim 12, wherein the sorting of at least one of the first batch of transactions or the further batch of transactions comprises scoring each transaction in a batch of transactions, and the processing transactions in the queue comprises processing transactions in order of score.

15. The computer program product according to claim 14, wherein the scoring each transaction comprises using a scoring definition based on one or more values from each transaction.

* * * * *